US009996724B2

(12) United States Patent
Gao et al.

(10) Patent No.: US 9,996,724 B2
(45) Date of Patent: Jun. 12, 2018

(54) OPTICAL FINGERPRINT DETECTION APPARATUS AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Gao, Beijing (CN); Yingming Liu, Beijing (CN); Xiaochuan Chen, Beijing (CN); Xiaochen Niu, Beijing (CN); Pengcheng Lu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/328,192

(22) PCT Filed: Jun. 30, 2016

(86) PCT No.: PCT/CN2016/087827
§ 371 (c)(1),
(2) Date: Jan. 23, 2017

(87) PCT Pub. No.: WO2017/063384
PCT Pub. Date: Apr. 20, 2017

(65) Prior Publication Data
US 2017/0270340 A1    Sep. 21, 2017

(30) Foreign Application Priority Data
Oct. 14, 2015    (CN) .......................... 2015 1 0661890

(51) Int. Cl.
*G06K 9/00* (2006.01)
*G06F 3/042* (2006.01)
(Continued)

(52) U.S. Cl.
CPC ......... *G06K 9/0004* (2013.01); *G06F 3/0421* (2013.01); *G02F 1/1368* (2013.01);
(Continued)

(58) Field of Classification Search
CPC ........................... G06K 9/0004; G06F 3/0421
See application file for complete search history.

(56) References Cited

U.S. PATENT DOCUMENTS 9,880,653 B2 *  1/2018  Baharv .................. G06F 3/0414
2014/0055418 A1   2/2014  Hsieh et al.
2015/0167921 A1 *  6/2015  Gollier ................. G02B 5/0263
                                                           362/326

FOREIGN PATENT DOCUMENTS

CN    101169824    4/2008
CN    101276406    10/2008
(Continued)

OTHER PUBLICATIONS

First Office Action from Chinese Patent Application No. 201510661890.5, dated Dec. 8, 2017, 17 pages.
(Continued)

*Primary Examiner* — Phuoc Tran
(74) *Attorney, Agent, or Firm* — Westman, Champlin & Koehler, P.A.

(57) ABSTRACT

An optical fingerprint detection apparatus and a display device are disclosed. The optical fingerprint detection apparatus includes: a light source; a touch panel including a first surface and a second surface, the first surface being provided with at least one touch area, the second surface being configured for receiving the light beam emitted from the
(Continued)

light source and angled with respect to the first surface by an angle of less than 90 degrees; and a detection unit located outside of the side of the touch panel opposite to the first surface and configured for receiving the light beam reflected by the touch area and emitted from the touch panel and detecting an intensity distribution of the received light beam.

20 Claims, 3 Drawing Sheets

(51) Int. Cl.
*G02F 1/1335* (2006.01)
*G02F 1/1368* (2006.01)
*G02F 1/1333* (2006.01)

(52) U.S. Cl.
CPC .... *G02F 1/13338* (2013.01); *G02F 1/133512* (2013.01); *G02F 1/133514* (2013.01); *G02F 1/133528* (2013.01)

(56) References Cited

FOREIGN PATENT DOCUMENTS

| | | |
|---|---|---|
| CN | 101814125 | 8/2010 |
| CN | 103631450 | 3/2014 |
| CN | 104751121 | 7/2015 |
| CN | 105184248 | 12/2015 |
| CN | 105184282 | 12/2015 |
| CN | 205068439 | 3/2016 |
| WO | WO 2005/078660 | 8/2005 |

OTHER PUBLICATIONS

International Search Report and Written Opinion of International Application No. PCT/CN2016/087827, dated Sep. 30, 2016.
English translation of Box No. V of the Written Opinion for the International Searching Authority for International Application No. PCT/CN2016/087827, 2 pages.

\* cited by examiner

OPTICAL FINGERPRINT DETECTION APPARATUS AND DISPLAY DEVICE

CROSS-REFERENCE TO RELATED APPLICATION

This application is a Section 371 National Stage Application of International Application No. PCT/CN2016/087827, filed on Jun. 30, 2016, entitled "OPTICAL FINGERPRINT DETECTION APPARATUS AND DISPLAY DEVICE", which claims priority to Chinese Application No. 201510661890.5, filed on Oct. 14, 2015, incorporated herein by reference in their entirety.

BACKGROUND

Technical Field

Embodiments of the present disclosure relate to a field of optical identification, and more particularly, to an optical fingerprint detection apparatus and a display device.

Description of the Related Art

With the development of fingerprint identification technology, it has been widely used in many fields, such as electronic equipment terminals including a mobile phone, a tablet computer, a television and the like, or security protection systems including an access control device, a steel safe and the like. Fingerprint acquisition is implemented mainly through an optical imaging technology, a capacitive imaging technology, an ultrasonic imaging technology or the like. Optical fingerprint identification technology can achieve a relatively large identification range, and has a relatively low cost.

At present, for example, in a LCD display, fingerprint identification is generally carried out in such a manner that fingerprint imaging is achieved through diffuse reflection by using a backlight plate and an optical imaging device. For example, upon illuminating a finger using a backlight as a light source, light ray is diffusely reflected back to an imaging sensor for imaging. A fingerprint identification image is formed by means of a difference between intensities of divergent light diffusely reflected from a trough (hereinafter referred to as a valley) and a crest (hereinafter referred to as a ridge) of a finger fingerprint. Since the energy of the diffusely reflected light is relatively weak and a signal difference between the valley and the ridge of the fingerprint is relatively small, such a manner raises a significantly high requirement for light transmittance of a portion where the diffusely reflected light transmits through and the sensitivity of a sensor, and presents a low anti-interference capability to other light rays.

SUMMARY OF THE INVENTION

In order to at least partially overcome the above-mentioned deficiencies and/or shortcomings in the prior arts, embodiments of the present disclosure aim to provide an optical fingerprint detection apparatus and a display device including the optical fingerprint detection apparatus, so as to improve sensitivity and accuracy of an optical fingerprint detection.

An embodiment of the present disclosure provides an optical fingerprint detection apparatus, comprising:

a light source for emitting a light beam;

a transparent touch panel comprising a first surface and at least one second surface adjacent to the first surface, the first surface being provided with at least one touch area which is to be touched by a finger or a toe, the second surface being configured for receiving the light beam emitted from the light source corresponding to the second surface and angled with respect to the first surface by an angle of less than 90 degrees so as to direct the light beam transmitted through the second surface into the touch panel toward the touch area of the first surface, and the touch area being arranged to totally reflect the light beam toward a side of the touch panel opposite to the first surface when the touch area is not touched by the finger or the toe; and a detection unit located outside of the side of the touch panel opposite to the first surface and configured for receiving the light beam reflected by the touch area and emitted from the touch panel and detecting an intensity distribution of the received light beam, wherein a refractive index of the touch panel is greater than a refractive index of air, and the angle between the second surface and the first surface is arranged such that an incidence angle of the light beam at the first surface satisfies a total reflection condition when the first surface is in contact with the air, and does not satisfy the total reflection condition when the first surface is in direct contact with human skin.

In an embodiment, the light source is arranged on the second surface.

In an embodiment, the light beam is perpendicularly emitted to the second surface.

In an embodiment, the optical fingerprint detection apparatus further comprises a frame disposed around the second surface of the touch panel, wherein the light source corresponding to the second surface is arranged on an inner wall of the frame.

In an embodiment, the optical fingerprint detection apparatus further comprises a display assembly located between the touch panel and the detection unit.

In an embodiment, the display assembly comprises a polarizer, a color filter, and a liquid crystal layer in this order.

In an embodiment, the optical fingerprint detection apparatus further comprises a thin film transistor substrate, wherein the detection unit is disposed between the liquid crystal layer and the thin film transistor substrate.

In an embodiment, the display assembly is adhered on the side of the touch panel opposite to the first surface via an adhesive layer, and the adhesive layer is located between the touch panel and the display assembly and has a refractive index substantially equal to that of the touch panel.

In an embodiment, the optical fingerprint detection apparatus further comprises a light shielding portion formed on a surface of the touch panel opposite to the first surface and disposed around the display assembly to form a non-display area.

In an embodiment, the detection unit comprises a first detection portion provided in a display area of the display assembly and a second detection portion provided in the non-display area of the display assembly, the first detection portion being configured to receive a portion of the light beam emitted from a side of the display assembly facing away from the touch panel, and the second detection portion being configured to receive a portion of the light beam emitted from a periphery of the display assembly.

In an embodiment, the touch area at least partially occupies a region on the first surface corresponding to the light shielding portion.

In an embodiment, the optical fingerprint detection apparatus comprises two light sources, each of which emits a light beam, the first surface is provided with two touch areas spaced apart from each other, and the touch panel is provided with two second surfaces facing to each other, the two second surfaces respectively receiving the light beams emitted from the two light sources and respectively directing the light beams to the two touch areas.

In an embodiment, the touch panel is made of at least one of glass, quartz, plastic, and resin material.

In an embodiment, a total area of the touch area occupies 70% or more of an area of the first surface.

In an embodiment, the light source is a surface light source.

In an embodiment, the incidence angle of the light beam onto the first surface has a total reflection critical angle where reflection of the light beam on the first surface is changed between the total reflection condition and a non-total reflection condition, the total reflection critical angle being determined by the refractive index of the touch panel and a refractive index of surrounding ambient medium in direct contact with the first surface.

In an embodiment, the angle between the second surface and the first surface is arranged such that the incidence angle of the light beam at the first surface is greater than or equal to the total reflection critical angle when the first surface is in contact with the air, and less than the total reflection critical angle when the first surface is in direct contact with the human skin.

An embodiment of the present disclosure also provides a display device, comprising the optical fingerprint detection apparatus according to any one of the above-described embodiments.

In the above-described embodiments of the present disclosure, an inclined light entrance surface is formed on a side surface of the touch panel such that it generates a total reflection signal and a non-total reflection signal at the touch area of the touch panel to detect fingerprint. This facilitates improving contrast and anti-interference of the detected signals of the "valley" and "ridge" of the fingerprint.

BRIEF DESCRIPTION OF THE DRAWINGS

In order to clearly understand the objectives, technical solutions and advantages of the present disclosure, the present disclosure will be described in detail below with reference to the exemplary embodiments and the accompanying drawings, in which.

DETAILED DESCRIPTION OF PREFERRED EMBODIMENTS

Figure 1:
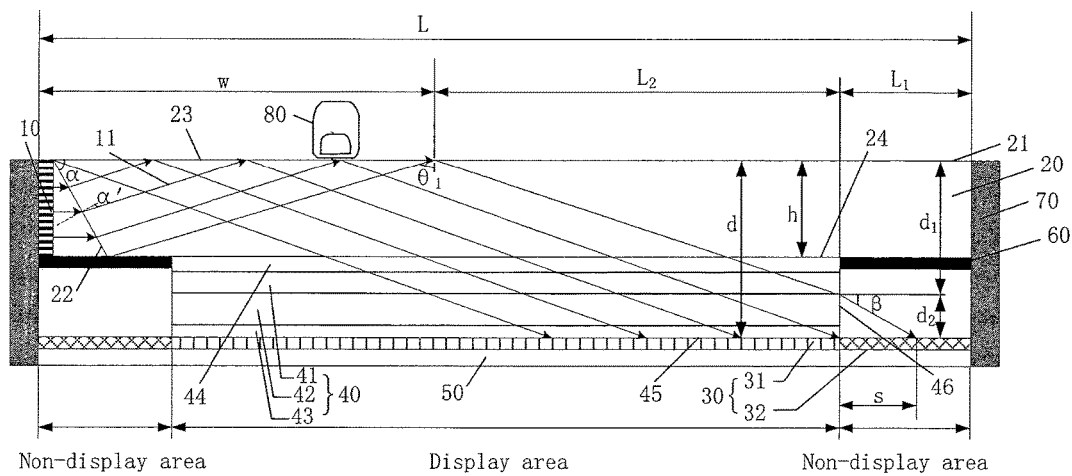
FIG. 1 is a schematic cross-sectional view of an optical fingerprint detection apparatus according to an embodiment of the present disclosure.

The technical solutions of the present disclosure will be described in more detail with reference to the following embodiments, together with the accompanying drawings. In the specification, the same or similar reference numerals refer to the same or similar parts. The following description of the embodiments of the present disclosure with reference to the accompanying drawings is intended to explain the general inventive concept of the present disclosure, but should not be interpreted as a limitation of the present disclosure.

In addition, in the following detailed description, for purposes of explanation, many specific details are set forth in order to provide a thorough understanding of the embodiments of the present disclosure. However, it will be apparent that one or more embodiments may be practiced without these specific details. In other cases, well-known structures and devices are illustratively shown so as to simplify the drawings.

The dimensions and shapes of various layers shown in the drawings do not indicate the real proportions of components of the optical fingerprint detection apparatus and the display device, instead, they are intended to schematically illustrate the present disclosure.

According to a general concept of an embodiment of the present disclosure, there is provided an optical fingerprint detection apparatus, comprising: a light source for emitting a light beam; a transparent touch panel comprising a first surface and at least one second surface adjacent to the first surface, the first surface being provided with at least one touch area which is to be touched by a finger or a toe, the second surface being configured for receiving the light beam emitted from the light source corresponding to the second surface and angled with respect to the first surface by an angle of less than 90 degrees so as to direct the light beam transmitted through the second surface into the touch panel toward the touch area of the first surface, and the touch area being arranged to totally reflect the light beam toward a side of the touch panel opposite to the first surface when the touch area is not touched by the finger or the toe; and a detection unit located outside of the side of the touch panel opposite to the first surface and configured for receiving the light beam reflected by the touch area and emitted from the touch panel and detecting an intensity distribution of the received light beam, wherein a refractive index of the touch panel is greater than a refractive index of air, and the angle between the second surface and the first surface is arranged such that an incidence angle of the light beam at the first surface satisfies a total reflection condition when the first surface is in contact with the air, and does not satisfy the total reflection condition when the first surface is in direct contact with human skin.

In the following detailed description, for purposes of explanation, many specific details are set forth in order to provide a thorough understanding of the embodiments of the present disclosure. However, it will be apparent that one or more embodiments may be practiced without these specific details. In other cases, well-known structures and devices are illustratively shown so as to simplify the drawings.

FIG. 1 shows an optical fingerprint detection apparatus 100 according to an embodiment of the present disclosure. The optical fingerprint detection apparatus 100 comprises a light source 10 for emitting a light beam 11, a touch panel 20 and a detection unit 30. The touch panel 20 comprises a first surface 21 (an upper surface in FIG. 1) and at least one second surface 22 adjacent to the first surface 21. The first surface 21 is provided with at least one touch area 23 which is to be touched by a finger or a toe. The second surface 22 is configured for receiving the light beam 11 emitted from the light source 10 and angled with respect to the first surface 21 by an angle of less than 90 degrees so as to direct the light beam 11 transmitted through the second surface 22 into the touch panel 20 toward the touch area 23 of the first surface 21. The touch area 23 is arranged to totally reflect the light beam 11 toward a side (a lower side of the touch panel 20 in FIG. 1) of the touch panel 20 opposite to the first surface 21 when the touch area 23 is not touched by the finger or the toe. The detection unit 30 is located outside of the side of the touch panel 20 opposite to the first surface 21, i.e., outside of the lower side of the touch panel 20 (underneath the touch panel 20 in FIG. 1), and the detection unit 30 is configured for receiving the light beam 11 reflected by the touch area 23 and emitted from the touch panel 20 and detecting an intensity distribution of the received light beam 11. By way of example, the detection unit 30 is, for example, a photoelectric sensor or any other detection device capable of detecting the optical signal strength.

In this embodiment, a refractive index of the touch panel 20 is greater than a refractive index of air, and the angle between the second surface 22 and the first surface 21 is arranged such that an incidence angle of the light beam 11 at the first surface 21 satisfies a total reflection condition when the first surface 21 is in contact with the air, and does not satisfy the total reflection condition when the first surface 21 is in direct contact with human skin. By way of example, the refractive index of the touch panel 20 is typically, for example, less than the refractive index of the human skin, but this is not necessary, for example, the refractive index of the touch panel 20 is alternatively greater than or equal to the refractive index of the human skin as long as the total reflection condition is not satisfied when the first surface 21 comes into direct contact with the human skin.

The human fingerprint consists of uneven texture structures having a certain pattern. Therefore, the fingerprint identification refers to reproduction of the uneven texture structures of the fingerprint. For convenience of description, in the following, the raised portion of the fingerprint will be referred to as "ridge" and the recessed portion will be referred to as "valley".

Figure 2:
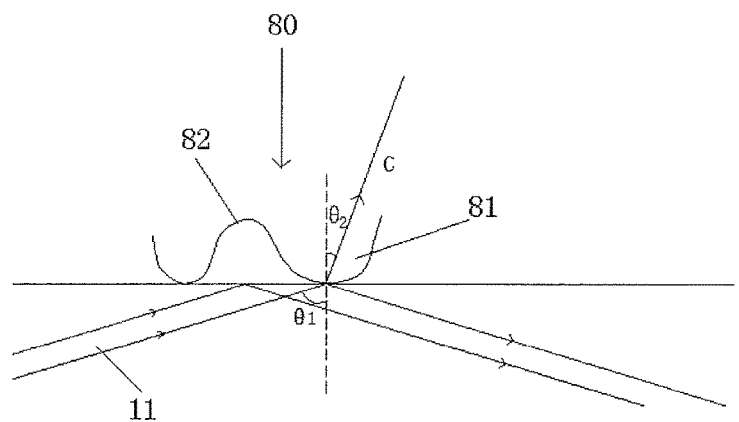
FIG. 2 schematically illustrates a fingerprint identification principle of an optical fingerprint detection apparatus according to an embodiment of the present disclosure.

FIG. 2 shows a schematic diagram of detecting finger fingerprint using the optical fingerprint detection apparatus according to the embodiment of the present disclosure. The "ridge" 81 in the fingerprint will be made in close contact with the touch area 23 and the "valley" 82 in the fingerprint will be kept away from the touch area 23 with a certain gap when the finger 80 presses against the touch area 23 of the first surface 21 of the touch panel 20. Thus, two kinds of interfaces are formed on the touch area 23. A region of the touch area 23 that is in contact with the "ridge" 81 in the fingerprint forms an interface between the finger 80 and the touch panel 20, and a region (including the region corresponding to the "valley" 82 in the fingerprint) of the touch area 23 that is not in contact with the "ridge" 81 in the fingerprint forms an interface between the touch panel 20 and a surrounding ambient media (typically air, but not limited thereto). The effects of these two interfaces on the light beam 11 are different. The light beam 11 remains totally reflected at the interface between the touch panel 20 and the surrounding ambient medium, while at the interface between the finger 80 and the touch panel 20, the total reflection condition is not satisfied due to the relatively large refractive index of the finger 80 (generally about 1.55), in this case, a portion of the light beam cannot be reflected back into the interior of the touch panel 20 (for example, it is refracted into the finger skin (see the light ray $C_1$ in FIG. 2) and absorbed by the finger skin), thereby attenuating reflection strength of the light beam 11.

Thus, upon the reflection of the light beam 11 on the touch area 23 of the first surface 21 of the touch panel 20, an alternately bright and dark pattern will appear in the light beam 11 and has a dark region corresponding to the "ridge" 81 in the fingerprint and a bright region corresponding to the "valley" 82 in the fingerprint. The pattern is for example obtained through the detection of the light intensity distribution of the received light beam using the detection unit 30. The pattern can reflect the texture distribution characteristics of the fingerprint. By means of this pattern, it facilitates realizing the fingerprint identification.

In order to allow a total reflection of the light beam 11 at the interface between the touch panel 20 and the surrounding ambient medium, the angle between the first surface 21 and the second surface 22 needs to satisfy certain conditions, which are for example derived from geometrical optics principles. Next, an exemplary introduction will be described in conjunction with a specific example.

In the embodiment shown in FIG. 1, it is assumed that $\alpha$ is an angle between the first surface 21 and the second surface 22, $\alpha'$ is a refraction angle of the light beam 11 at the second surface 22, $\theta_1$ is an incidence angle of the light beam 11 at the touch area 23, w is a width of the touch area 23, h is a thickness of the touch panel 20 and n is a medium refraction index of the touch panel 20. It can be derived from the geometric relations and optical principles shown in FIG. 1 that:

$$\sin\alpha' = \frac{\cos\alpha}{n} \quad (1)$$

$$\theta_1 = \alpha' + \alpha \quad (2)$$

$$w = h*\tan\theta_1 + h/\tan\alpha \quad (3)$$

In accordance with the total reflection principle, in order to achieve the total reflection of the light beam 11 at the interface between the touch panel 20 and the surrounding ambient medium, it is necessary to satisfy that $\theta_1$ is greater than or equal to a total reflection critical angle. Thus, the first surface 21 has a total reflection critical angle, by which the reflection of the light beam 11 on the first surface 21 may be changed between total reflection and non-total reflection, and the total reflection critical angle is determined by the refractive index of the touch panel 20 and the refractive index of the surrounding ambient medium. It is obtained from the above equation (2) that:

$$\alpha = \theta_1 - \alpha' \geq \theta_c - \alpha' \quad (4)$$

where $\theta_c$ is a total reflection critical angle of the first surface 21 at the interface between the touch panel 20 and the surrounding ambient medium, the total reflection critical angle being determined by the refractive index of the touch panel 20 and the refractive index of the surrounding ambient medium. The refraction angle $\alpha'$ of the light beam 11 at the second surface 22 is determined by the incidence angle of the light beam 11 at the second surface 22, the refractive index of the touch panel 20 and the refractive index of the surrounding ambient medium. In order to achieve the total reflection of the light beam 11 at the interface between the touch panel 20 and the surrounding ambient medium, it is necessary that $\theta_1$ is greater than or equal to the total reflection critical angle $\theta_c$, the angle $\alpha$ between the second surface and the first surface is arranged such that the incidence angle $\theta_1$ of the light beam at the first surface is greater than or equal to the total reflection critical angle $\theta_c$ when the first surface is in contact with the air, and less than the total reflection critical angle $\theta_c$ when the first surface is in direct contact with the human skin. It can be seen that the range of the angle $\alpha$ between the first surface 21 and the second surface 22 depends on the refractive index of the touch panel 20, the refractive index of the surrounding ambient medium and the incidence angle of the light beam 11 at the second surface 22.

In an embodiment, the angle α between the first surface 21 and the second surface 22 may be for example determined according to the above equation (4). The range of values of w and h may be for example determined according to the relationship between the width w of the touch area 23 and the thickness h of the touch panel 20 in the above equation (3). As an example, the incident angle of the light beam 11 at the second surface 22 is, for example, 90−α, i.e., the light beam 11 is incident onto the second surface 22 in a horizontal direction, as shown in FIG. 1.

In view of a special case, when the light beam 11 is perpendicularly emitted to the second surface 22, the refraction angle α' is zero, then it can be derived from the above equation (4) that:

$$\alpha = \theta_1 \geq \theta_c \qquad (5)$$

In the case where the total reflection critical angle $\theta_c$ is determined, then the range of the angle α between the first surface 21 and the second surface 22 is maximized. This is beneficial for design and processing of the touch panel 20.

In an embodiment, as shown in FIG. 1, the optical fingerprint detection apparatus 100 further comprises a frame 70 disposed around the second surface 22 of the touch panel 20. The frame 70 is for example used to hold and fix the touch panel 20. The light source 10 is for example arranged on an inner wall of the frame 70. Such an arrangement of the light source 10 facilitates the assembly of the optical fingerprint detection apparatus 100.

In an embodiment, as shown in FIG. 1, the optical fingerprint detection apparatus 100 for example further comprises a display assembly 40 located between the touch panel 20 and the detection unit 30. In this case, the detection unit 30 is for example arranged to receive the light beam 11 emitted from the touch panel 20 and transmitted through the display assembly 40. By way of example, the display assembly 40 comprises for example, a polarizer 41, a color filter 42 and a liquid crystal layer 43 in this order. By way of example, the display assembly 40 is for example configured to display the location of the touch area 23, or for example configured to prompt the finger (or toe) when the touch area 23 is effective to be pressed by displaying information. This also facilitates the operation of the optical fingerprint identification. By way of example, the optical fingerprint detection apparatus 100 further comprises a thin film transistor substrate 50, wherein the detection unit 30 is disposed between the liquid crystal layer 43 and the thin film transistor substrate 50. In this way, the detection unit 30 may be for example integrated with the display assembly 40 and the thin film transistor substrate 50 during fabrication, so as to simplify the process and achieve a compact structure. Although the liquid crystal display assembly is taken as an example to describe the present disclosure in the above examples, it should be understood that the present disclosure is not limited thereto. For example, other types of display assemblies (such as organic light emitting diode display assemblies) may also be applied to the optical fingerprint detection apparatus 100 according to the embodiments of the present disclosure.

In an embodiment, the display assembly 40 is adhered on the side (the lower surface of the touch panel 20 in FIG. 1) of the touch panel 20 opposite to the first surface 21 via an adhesive layer 44, and the adhesive layer 44 is located between the touch panel 20 and the display assembly 40. By way of example, the adhesive layer 44 (for example, an OCA optical adhesive) for example has a refractive index substantially equal to that of the touch panel 20, for example, the difference between the refractive index of the adhesive layer 44 and the refractive index of the touch panel 20 is within 1% of the refractive index of the adhesive layer 44 or the refractive index of the touch panel 20. This will not cause a significant refraction phenomenon and the deflection of the light beam 11 is relatively small when the light beam 11 is transmitted through the adhesive layer 44 from the side of the touch panel 20 opposite to the first surface 21, thereby facilitating the design of the system and the improvement of optical efficiency.

In an embodiment, the optical fingerprint detection apparatus 100 for example further comprises a light shielding portion 60 formed on a surface (the lower surface of the touch panel 20 in FIG. 1) of the touch panel 20 opposite to the first surface 21 and disposed around the display assembly 40 to form a non-display area. For example, the light shielding portion 60 is configured to form a non-display area, which is for example used to form a trim, a keypad area, and the like. As an example, the light shielding portion 60 is for example formed of an ink coating.

In an embodiment, the detection unit 30 for example comprises a first detection portion 31 provided in a display area of the display assembly 40 and a second detection portion 32 provided in the non-display area of the display assembly 40. The first detection portion 31 is configured to receive a portion of the light beam 11 transmitted through a side 45 (the lower side of the display assembly 40 in FIGS. 1 and 3) of the display assembly 40 facing away from the touch panel, and the second detection portion 32 is configured to receive a portion of the light beam 11 transmitted through a periphery 46 of the display assembly 40. The detection portions of the detection unit 40 are arranged within the display area and the non-display area of the display assembly 40, respectively, in this way, it increases the area of detection unit 30 receiving the optical signal, thereby increasing the area of the touch panel 23. In an embodiment, the touch area 23 for example at least partially occupies a region on the first surface 21 corresponding to the light shielding portion 60, which further increases the area of the touch panel 23.

In the embodiment shown in FIG. 1, L is an entire length of the first surface 21; $L_1$ is a width of the non-display area; $L_2$ is a distance from the right edge of the touch area 23 to the left edge of the right non-display area; β is an refraction angle of the light beam 11 at the periphery 46 of the display assembly 40; d is a thickness from the first surface 21 of the touch panel 23 to the detection unit 30 (or to the lower surface of the liquid crystal layer 43); d1 is a thickness from a position, at which the outermost edge of the light beam 11 exits from the periphery 46 of the display assembly 40, to the first surface 21 of the touch panel 23; d2 is a thickness from a position, at which the outermost edge of the light beam 11 exits from the periphery 46 of the display assembly 40, to the detection unit 30 (or to the lower surface of the liquid crystal layer 43); and s is a width of a fingerprint detection area provided in the non-display area.

According to the geometrical relationship shown in FIG. 1, it can be derived that:

$$L_2 = L - L_1 - w \qquad (6)$$

$$d_1 = \frac{L_2}{\tan\theta_1} \qquad (7)$$

-continued $$d_2 = d - d_1 \quad (8)$$

$$\sin\beta = n \ast \cos\theta_1 \quad (9)$$

$$s = \frac{d_2}{\tan\beta} \quad (10)$$

$$s < L_1 \quad (11)$$

For example, with reference to the above equations (1)-(11), sizes of the various structures shown in FIG. 1 may be obtained.

Figure 3:
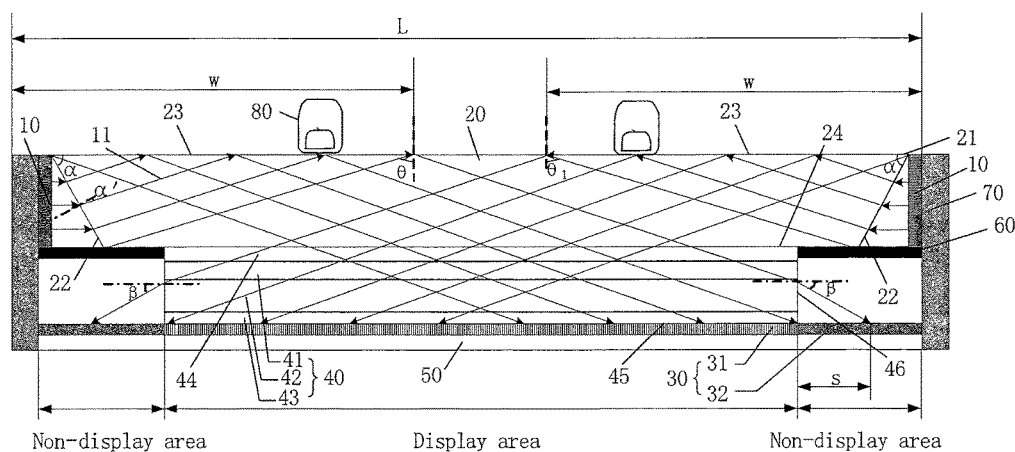
FIG. 3 is a schematic cross-sectional view of an optical fingerprint detection apparatus according to another embodiment of the present disclosure.

FIG. 3 is a schematic cross-sectional view of an optical fingerprint detection apparatus 100' according to another embodiment of the present disclosure. In this embodiment, two light sources 10 for emitting respective light beams 11 are provided. The first surface 21 of the touch panel 20 is provided with two touch areas 23 spaced apart from each other, and accordingly, the touch panel 20 is provided with two second surfaces 22 opposite to each other. Each of the second surfaces 22 receives the light beam 11 emitted from the corresponding light source 10 and directs it to the corresponding touch area 23, respectively. Thus, for example, the total area of the touch area 23 on the first surface 21 is maximized. For each of the touch areas 23 and each of the second surfaces 22, the operation principle thereof is the same as that of the foregoing embodiment. For example, each of the second surfaces 22 is configured to be angled by an angle of less than 90 degrees with respect to the first surface 21 and to satisfy the total reflection requirement on the corresponding touch area 23. By way of example, each of the touch areas 23 is for example correspondingly provided with a light shielding portion 60, a non-display area and the like. The remaining structures are substantially the same as those of the foregoing embodiment, and the detailed description thereof will not be repeated. By way of example, angles between the second surfaces 22 and the first surface 21 are for example the same as or different from each other, so as to accommodate different design needs.

Figure 4:
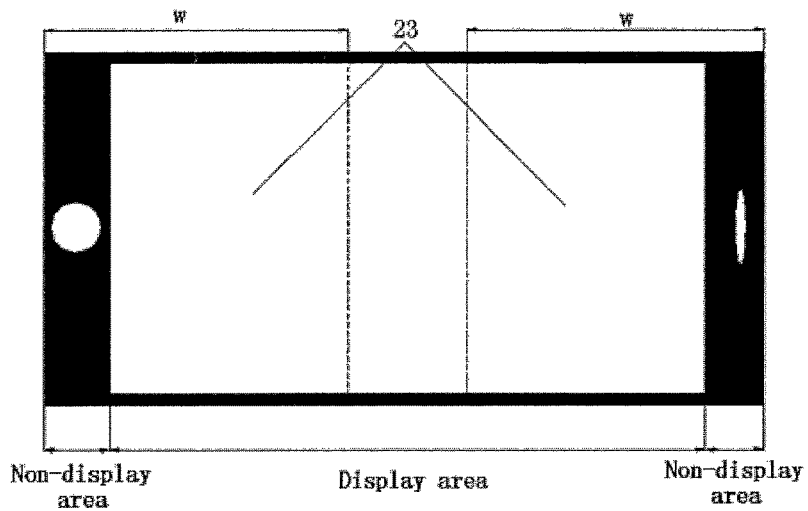
FIG. 4 is a schematic top view of the optical fingerprint detection apparatus shown in FIG. 3.

FIG. 4 is a top view of the optical fingerprint detection apparatus 100' shown in FIG. 3. There is shown two touch areas 23 in FIG. 4, these two touch areas 23 not only cover a relatively large display area 71, but also cover a non-display area.

Although the optical fingerprint detection apparatus having one or two touch regions is taken as an example to describe the present disclosure in the above embodiments, it should be understood that the present disclosure is not limited thereto. The first surface 21 of the optical fingerprint detection apparatus according to the embodiment of the present disclosure may for example have three, four, or more touch areas.

Figure 5:
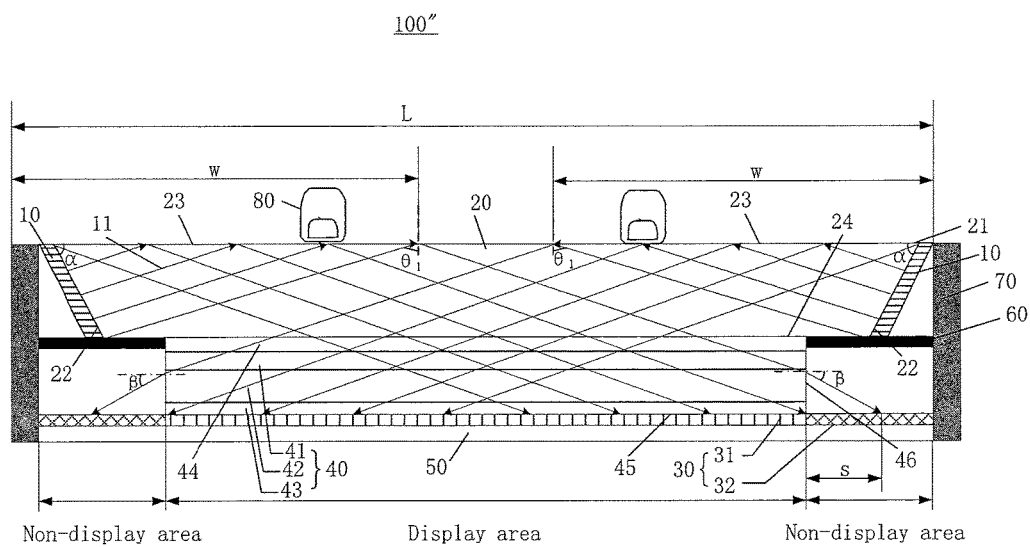
FIG. 5 is a schematic cross-sectional view of an optical fingerprint detection apparatus according to a further embodiment of the present disclosure.

FIG. 5 is a schematic top view of an optical fingerprint detection device 100" according to a further embodiment of the present disclosure. This embodiment differs from the embodiment shown in FIG. 3 only in that the light source 10 is arranged on the second surface 22. The light source 10 is arranged on the second surface 22, thereby for example reducing the light energy loss by directly directing the light beam 11 into the touch panel 20. In addition, such an arrangement also facilitates the incidence of the light beam 11 perpendicular to the second surface 22 to increase the range of the angle between the first surface 21 and the second surface 22. In one example, the light source 10 is for example affixed to the second surface 22, and the light source 10 is for example a flexible light source.

Next, some specific calculation results of the fingerprint detection using the optical fingerprint detection apparatus according to the embodiments of the present disclosure are provided.

A reflectance of the light beam 11 at the interface between the finger 80 and the touch panel 20 in FIG. 2 is for example calculated according to the following equations:

$$n\sin\theta_1 = n'\sin\theta_2 \quad (12)$$

$$\rho = \frac{1}{2}\left[\frac{\sin^2(\theta_1 - \theta_2)}{\sin^2(\theta_1 + \theta_2)} + \frac{\tan^2(\theta_1 - \theta_2)}{\tan^2(\theta_1 + \theta_2)}\right] \quad (13)$$

where n is a medium refractive index of the touch panel 20, n' is a refractive index of the skin of the finger 80, ρ is a reflectance of the light beam 11 at the interface between the finger 80 and the touch panel 20, $\theta_1$ is an incidence angle of the light beam 11 on the touch area 23, and $\theta_2$ is a refraction angle of the light beam 11 at the interface between the finger 80 and the touch panel 20.

In one example, an application of the optical fingerprint detection apparatus in a mobile phone with a 5 inches display screen is taken as an example, providing that a length of the display area is 110 mm, a thickness h of the touch panel 20 is 0.55 mm, a thickness of the adhesive layer 44 is 0.1 mm, a thickness of the polarizer 41 is 0.1 mm, a thickness of the color filter 42 is 0.2 mm, and a thickness of the liquid crystal layer 43 is 0.003 mm, then the thickness d from the first surface 21 of the touch panel 23 to the lower surface of the liquid crystal layer 43 is 0.953 mm, the width of the non-display area is equal to 15 mm, the entire length L1 of the touch panel 20 is equal to 110+2*s, which is equal to 140 mm, and the medium refractive index n of the touch panel 20 is equal to 1.5163.

For the case where the light beam 11 enters the second surface 22 in the horizontal direction, shown in FIGS. 1 and 3, when a is equal to 88.28°, the width w of the touch area 23 is equal to 53.81 mm, the width s of the fingerprint detection area provided in the non-display area is equal to 14.53 mm, thereby the width of the touch area 23 is for example 53.81 mm. In the case where the touch panel 20 is made of glass, it can be for example derived from the equations (12)-(13) that the reflectance ρ of the light beam 11 at the interface between the finger 80 and the touch panel 20 (at the "ridge" 81 of the fingerprint) is equal to 82.1%. Theoretically, at the "valley" 82 of the fingerprint, the light beam 11 will be totally reflected, i.e., the reflectance is 100%. Thus, when the reflectance ρ of the light beam 11 at the interface between the finger 80 and the touch panel 20 is lower, the difference between the light intensity signals corresponding to the "valley" 82 and the "ridge" 81 of the fingerprint is greater, and the detected fingerprint image is more clear.

TABLE 1

| α | 2w | ρ |
|---|---|---|
| 88.28° | 2 × 53.81 mm | 82.1% |
| 87° | 2 × 30.86 mm | 70.9% |
| 85° | 2 × 18.53 mm | 56.4% |

Table 1 shows exemplary results of the width w (2w refers to the case of two touch areas) of the touch area 23 and the change of the reflectance ρ with respect to α in the embodiment shown in FIG. 3. It can be seen from Table 1 that the reflectance ρ decreases as α becomes smaller, but the width w of the touch area 23 also becomes small. In practice, an appropriate value of α is chosen, for example, according to the actual requirements, such as the desired area of the touch area 23 and the detection performance of the detection unit 30 and so on. For example, the angle between the first surface 21 and the second surface 22 may be selected to be less than 88 degrees, less than 87 degrees, or less than 85 degrees, etc.

For the embodiment in which the light source 10 is arranged on the second surface 22, as shown in FIG. 5, based on the above-described assumed parameters, a similar result is also obtained, for example, as shown in Table 2.

TABLE 2

| α | 2w | ρ |
|---|---|---|
| 89.41° | 2 × 53.41 mm | 82% |
| 88.5° | 2 × 21.02 mm | 60.4% |
| 87° | 2 × 10.52 mm | 36.8% |

It can be seen by comparing the results of Table 1 and Table 2 that the reflectance ρ and the width w of the touch area 23 more sharply decrease as α decreases in the embodiment in which the light source 10 is arranged on the second surface 22, as compared to the embodiment shown in FIG. 3.

In an embodiment of the present disclosure, the touch panel 20 is for example made of at least one of a variety of completely transparent or partially transparent materials, such as glass, quartz, plastic, resin and the like.

By way of example, the total area of the touch area 23 for example accounts for 10%, 30%, 50%, or 70% or more of the area of the first surface 21. This facilitates achieving a large area fingerprint identification area on the display screen.

In an embodiment of the present disclosure, the light source 10 is for example a surface light source. This for example allows the light beam 11 emitted from the light source 10 to be a uniform parallel light beam, thereby improving the optical detection effect. But this is not necessary, for example, the light source 10 may also use other types of light sources, such as a LED spot light source.

The fingerprint "valley" and "ridge" signals obtained by the optical fingerprint detection apparatus according to the embodiments of the present disclosure may for example be compared and identified by any one of fingerprint identification algorithms in the prior arts.

It should be noted that the optical fingerprint detection apparatus according to the embodiments of the present disclosure is not only configured to detect a fingerprint of a finger, but also configured to alternatively detect a skin texture structure of other parts of the human body, such as a toe fingerprint, a dermatoglyph and the like.

The embodiments of the present disclosure also provide a display device comprising the optical fingerprint detection apparatus 100, 100', 100" according to any one of the above-described embodiments. By means of the optical fingerprint detection apparatus 100, 100', 100", the display device can have an accurate optical fingerprint detection function While the present disclosure has been described in connection with the accompanying drawings, the embodiments disclosed in the drawings are intended to illustrate the preferred embodiments of the present disclosure, but should not be construed as limiting the present disclosure. For clarity, the proportions in the schematic drawings do not indicate a real proportional relationship of actual components.

Although some embodiments in the general inventive concept of the present disclosure have been shown and described, it will be understood by those skilled in the art that changes may be made to these embodiments without departing from the principle and spirit of the general inventive concept, and the scope of the present disclosure is defined by the claims and their equivalents.

What is claimed is:

1. An optical fingerprint detection apparatus, comprising:
   a light source for emitting a light beam;
   a transparent touch panel comprising a first surface and at least one second surface adjacent to the first surface, the first surface being provided with at least one touch area which is to be touched by a finger or a toe, the second surface being configured for receiving the light beam emitted from the light source corresponding to the second surface and angled with respect to the first surface by an angle of less than 90 degrees so as to direct the light beam transmitted through the second surface into the touch panel toward the touch area of the first surface, and the touch area being arranged to totally reflect the light beam toward a side of the touch panel opposite to the first surface when the touch area is not touched by the finger or the toe; and
   a detection unit located outside of the side of the touch panel opposite to the first surface and configured for receiving the light beam reflected by the touch area and emitted from the touch panel and detecting an intensity distribution of the received light beam,
   wherein a refractive index of the touch panel is greater than a refractive index of air, and the angle between the second surface and the first surface is arranged such that an incidence angle of the light beam at the first surface satisfies a total reflection condition when the first surface is in contact with the air, and does not satisfy the total reflection condition when the first surface is in direct contact with human skin.

2. The optical fingerprint detection apparatus according to claim 1, wherein the light source is arranged on the second surface.

3. The optical fingerprint detection apparatus according to claim 2, wherein the optical fingerprint detection apparatus comprises two light sources, each of which emits a light beam, the first surface is provided with two touch areas spaced apart from each other, and the touch panel is provided with two second surfaces facing to each other, the two second surfaces respectively receiving the light beams emitted from the two light sources and respectively directing the light beams to the two touch areas.

4. The optical fingerprint detection apparatus according to claim 2, wherein the light beam is perpendicularly emitted to the second surface.

5. The optical fingerprint detection apparatus according to claim 4, wherein the optical fingerprint detection apparatus comprises two light sources, each of which emits a light beam, the first surface is provided with two touch areas spaced apart from each other, and the touch panel is provided with two second surfaces facing to each other, the two second surfaces respectively receiving the light beams emitted from the two light sources and respectively directing the light beams to the two touch areas.

6. The optical fingerprint detection apparatus according to claim 1, further comprising a frame disposed around the second surface of the touch panel, wherein the light source corresponding to the second surface is arranged on an inner wall of the frame.

7. The optical fingerprint detection apparatus according to claim 1, further comprising a display assembly located between the touch panel and the detection unit.

8. The optical fingerprint detection apparatus according to claim 7, wherein the display assembly comprises a polarizer, a color filter, and a liquid crystal layer in this order.

9. The optical fingerprint detection apparatus according to claim 8, further comprising a thin film transistor substrate, wherein the detection unit is disposed between the liquid crystal layer and the thin film transistor substrate.

10. The optical fingerprint detection apparatus according to claim 7, wherein the display assembly is adhered on the side of the touch panel opposite to the first surface via an adhesive layer, and the adhesive layer is located between the touch panel and the display assembly and has a refractive index substantially equal to that of the touch panel.

11. The optical fingerprint detection apparatus according to claim 7, further comprising a light shielding portion formed on a surface of the touch panel opposite to the first surface and disposed around the display assembly to form a non-display area.

12. The optical fingerprint detection apparatus according to claim 11, wherein the detection unit comprises a first detection portion provided in a display area of the display assembly and a second detection portion provided in the non-display area of the display assembly, the first detection portion being configured to receive a portion of the light beam emitted from a side of the display assembly facing away from the touch panel, and the second detection portion being configured to receive a portion of the light beam emitted from a periphery of the display assembly.

13. The optical fingerprint detection apparatus according to claim 11, wherein the touch area at least partially occupies a region on the first surface corresponding to the light shielding portion.

14. The optical fingerprint detection apparatus according to claim 1, wherein the optical fingerprint detection apparatus comprises two light sources, each of which emits a light beam, the first surface is provided with two touch areas spaced apart from each other, and the touch panel is provided with two second surfaces facing to each other, the two second surfaces respectively receiving the light beams emitted from the two light sources and respectively directing the light beams to the two touch areas.

15. The optical fingerprint detection apparatus according to claim 1, wherein the touch panel is made of at least one of glass, quartz, plastic, and resin material.

16. The optical fingerprint detection apparatus according to claim 1, wherein a total area of the touch area occupies 70% or more of an area of the first surface.

17. The optical fingerprint detection apparatus according to claim 1, wherein the light source is a surface light source.

18. The optical fingerprint detection apparatus according to claim 1, wherein the incidence angle of the light beam onto the first surface has a total reflection critical angle where reflection of the light beam on the first surface is changed between the total reflection condition and a non-total reflection condition, the total reflection critical angle being determined by the refractive index of the touch panel and a refractive index of surrounding ambient medium in direct contact with the first surface.

19. The optical fingerprint detection apparatus according to claim 18, wherein the angle between the second surface and the first surface is arranged such that the incidence angle of the light beam at the first surface is greater than or equal to the total reflection critical angle when the first surface is in contact with the air, and less than the total reflection critical angle when the first surface is in direct contact with the human skin.

20. A display device, comprising the optical fingerprint detection apparatus according to claim 1.

* * * * *